United States Patent [19]

Bankart et al.

[11] Patent Number: 4,575,628

[45] Date of Patent: Mar. 11, 1986

[54] PATTERN SCANNER PROVIDING DATA TO A COMPUTER WHICH CARRIES OUT LAY PLANNING

[75] Inventors: Adrian E. Bankart; Clive N. Jenkins, both of London, Great Britain

[73] Assignee: Cybrid Limited, London, England

[21] Appl. No.: 440,273

[22] Filed: Nov. 9, 1982

[30] Foreign Application Priority Data

Nov. 9, 1981 [GB] United Kingdom ............... 8133723

[51] Int. Cl.⁴ ..................... G01B 11/00; H04N 1/10
[52] U.S. Cl. .................... 250/235; 250/578; 356/377; 364/560
[58] Field of Search ............ 250/202, 563, 571, 572, 250/561, 562, 234, 235, 578; 318/577; 356/376, 377, 429, 430, 431, 238, 239; 364/559, 560, 564

[56] References Cited

U.S. PATENT DOCUMENTS

| | | | |
|---|---|---|---|
| 3,617,629 | 11/1971 | McCarthy | 250/202 |
| 3,717,848 | 2/1973 | Irving et al. | |
| 3,886,371 | 5/1975 | Lloyd | |
| 3,976,837 | 8/1976 | Alien et al. | |
| 4,147,930 | 4/1979 | Browne et al. | 250/202 |
| 4,232,342 | 11/1980 | Skala | |
| 4,240,118 | 12/1980 | Wellendorf | |
| 4,245,259 | 1/1981 | Pick | |
| 4,417,149 | 11/1983 | Takeuchi et al. | 250/563 |

FOREIGN PATENT DOCUMENTS

| | | |
|---|---|---|
| 0038070 | 4/1981 | European Pat. Off. |
| 1162096 | 8/1969 | United Kingdom |
| 1165223 | 9/1969 | United Kingdom |
| 1176604 | 1/1970 | United Kingdom |
| 1199935 | 7/1970 | United Kingdom |
| 1298128 | 11/1972 | United Kingdom |
| 1345482 | 1/1974 | United Kingdom |
| 1397159 | 6/1975 | United Kingdom |

*Primary Examiner*—Edward P. Westin
*Attorney, Agent, or Firm*—Merchant, Gould, Smith, Edell, Welter, & Schmidt

[57] ABSTRACT

A pattern scanner comprises a plurality of light-sensitive elements guided in X and Y co-ordinate directions to scan a screen on which one or more pattern pieces are laid. The scanner detects outer and inner boundaries of the pieces, and analyses the inner boundaries to identify information such as grain direction, piece identity and drill holes.

25 Claims, 13 Drawing Figures

PATTERN SCANNER PROVIDING DATA TO A COMPUTER WHICH CARRIES OUT LAY PLANNING

BACKGROUND OF THE INVENTION

This invention relates to pattern scanners and is particularly applicable to lay planning machines.

A lay planning machine is a machine for use in the garment trade for planning lays from graded patterns and for producing markers, i.e. printed sheets conveying a planned arrangement of the pattern from which garment pieces may be cut.

Software is available for lay planning, but it requires that the user have a computer with suitable peripherals, in particular an input device, such as a digitizer, for reading the patterns.

A conventional input device available in the art comprises a stylus connected to a stylus position sensing means and a memory means, whereby said stylus is manually traced around the boundary of a pattern piece thereby providing a memory map of the external boundary of the pattern piece. This device, however, requires a skilled operator to trace the pattern piece boundary accurately. British Specification Nos. 1162096 and 1165223 disclose devices which detect a pattern curve boundary and trace around the boundary automatically to enable one to provide a memory map of the boundary.

These devices necessarily take a considerable amount of time in mapping the boundary as continual calculation is involved during the boundary tracing, as are a large number of direction changes over each section of a boundary.

It is thus desirable to maintain the objective of automatic scanning of a pattern piece whilst at the same time simplifying the scanner functioning, in particular simplifying the mechanical functioning of the scanner.

SUMMARY OF THE INVENTION

According to one aspect of the present invention, there is provided a pattern scanner, for scanning pattern pieces, comprising a plurality of radiation-sensitive elements and means for guiding said elements in X and Y coordinate directions with said elements evenly spaced in the Y coordinate directions with the means for controlling the guiding means to cause the radiation-sensitive elements to make scans in the X coordinate direction, said scans alternating with stepping in the Y coordinate direction in order to scan a matrix of unitary areas encompassing the entire area of a pattern piece within its outer boundary. Also included in this invention is a means for transmitting the data sensed by the elements during scanning in both X directions.

Preferably, there is a plurality of such radiation-sensitive elements carried by a reading head guided by the guiding means, so that a plurality of unitary areas can be sensed simultaneously. In such a case, two successive scans (in opposite directions) can be spaced in the Y co-ordinate direction by one-half (or an odd multiple of one-half) of the spacing between adjacent elements, so that the scanning is interlaced. A unitary area will then have, normally, a dimension which is about one-half of said spacing. Scanning speed increases according to the number of elements provided.

Because the scanner can traverse the full X direction and is not diverted from its course when locating a boundary, two new possibilities emerge. One is that the scanner can scan more than one piece and the other is that inner boundaries can be detected. In this latter respect, the devices of the above-mentioned specifications simply map the outer boundary of a single curve; they are unable to extract further data from the item, e.g. pattern piece, having that boundary. Important information, such as grain direction, positions of grading points and drill holes, and pattern piece identification must still be fed in by a skilled operator.

Thus a preferred embodiment of the present invention can detect inner boundaries because of the method of scanning of a complete piece, thus enabling one to interpret data relevant to the pattern piece from the size, position and arrangement of such inner boundaries. Such interpretation may be effected by scanner computational circuitry after scanning or, preferably, at least in part during idle times during scanning, when the computational circuitry is not involved in directing the scanner. Thus, preferably said data comprises digital data composed of bits having a first state, when a unitary area of a first type is detected corresponding to material contained in an area of a pattern piece, and a second state when a unitary area of a second type is detected corresponding to an absence of material of a pattern piece, unitary areas of the second type comprising an area outside the material of any pattern piece, an area within a hole within a pattern piece or an area of a pattern piece having a property, as sensed by the element or elements, equivalent to the absence of pattern piece material.

According to a second aspect of the invention, there is provided a scanner for scanning pattern pieces comprising a support for supporting at least one pattern piece to be scanned and a scanning means comprising a plurality of radiation-sensitive elements scanning across at least one pattern piece without interruption in the X coordinate direction. Such scans are alternated with stepping in the Y coordinate direction to sense each scan in the X coordinate direction. Radiation reflected from the support piece by each pattern piece being scanned is detected by said elements to provide data which identify and locate the area of said pattern pieces. The identification process of each pattern piece consists of detecting the areas outside a pattern piece, detecting holes within a pattern piece, and detecting an area of a pattern piece having holes. An integral element of this invention is a means for storing the characteristics corresponding to different types of pattern pieces as detected by the scanner. A processing means is included in this invention whereby the stored information can be analyzed to identify, locate and distinguish between several different pattern pieces scanned at the same time. This allows multiple separate pattern pieces to be scanned and separately stored and analyzed.

BRIEF DESCRIPTION OF THE DRAWINGS

Reference will now be made, by way of example, to the accompanying drawings in which.

DESCRIPTION OF A PREFERRED EMBODIMENT

Figure 1:
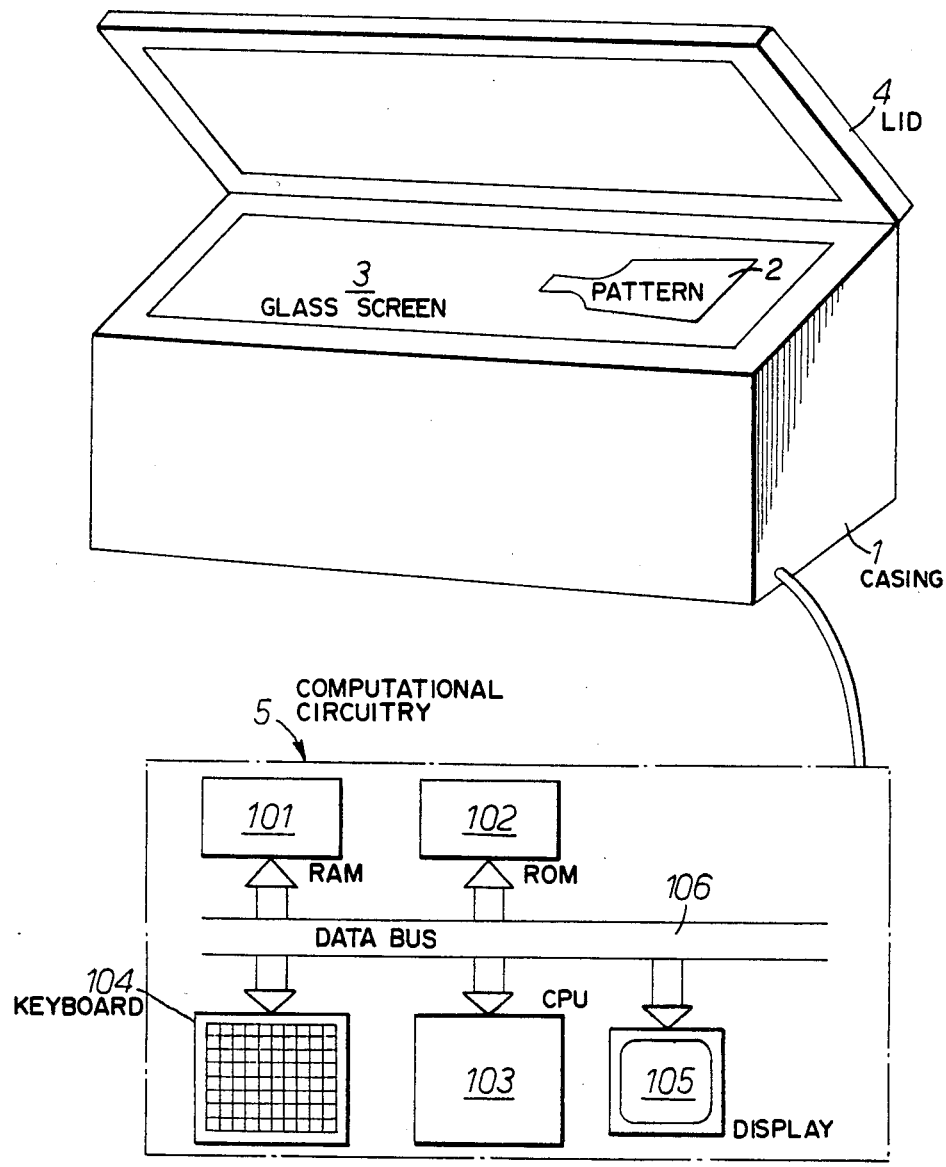
FIG. 1 is a perspective view of a lay planning scanner embodying the present invention.

A lay planning scanner is illustrated in perspective in FIG. 1, the scanner having been designed for the specific task of producing data from graded or non-graded patterns 2 for planning lays for markers. The prime design objectives have been to replace expensive skilled labor with cheaper unskilled labor, reducing time, reducing space requirements and being very cost effective both in terms of capital costs and running costs.

The scanner shown in FIG. 1 comprises a casing 1 having a glass screen 3 and a pivoted lid 4.

Computational circuitry 5, comprising random access memory 101, a read only memory 102, a central processing unit 103, a keyboard 104, a display 105 and a data bus 106, is connected to control the operation of the scanner and provide data to a computer which carries out the lay planning. Such computational circuitry might also be incorporated within the computer which carries out the lay planning.

Figure 3:
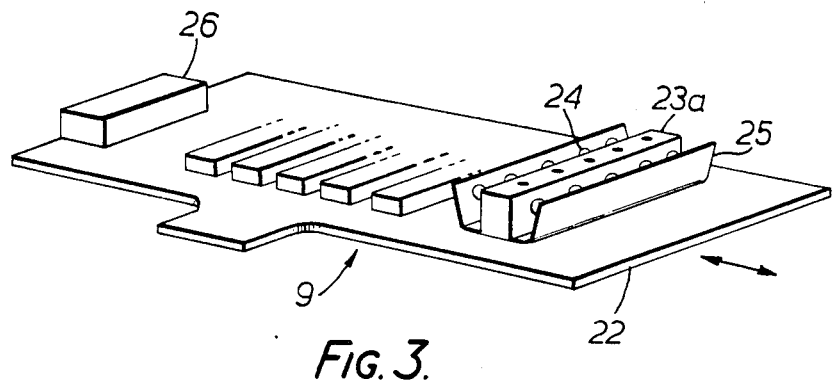
FIG. 3 is a view of a scanner head for use in the scanner of FIG. 1.
Figure 4:
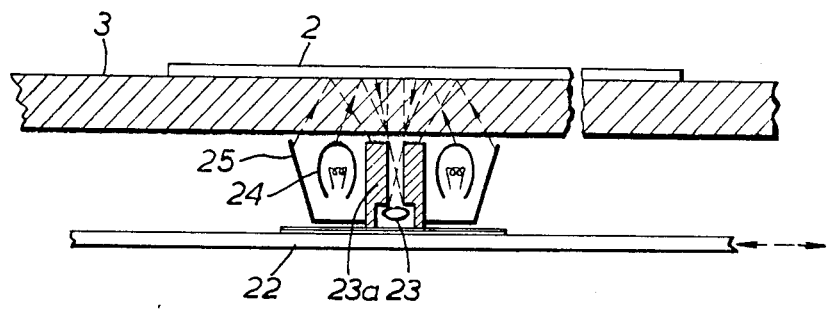
FIG. 4 is a side view of a detail of FIG. 3.

The scanner will now be described with reference to FIGS. 2 to 4.

In operation, pattern pieces are placed face down in random positions on the glass screen of the scanner, the lid 4 is closed and the scanner is instructed to scan by instructions fed in through the keyboard 104. When the scanner has scanned the complete screen the lid opens automatically.

The scanner comprises a tubular steel frame, onto which are mounted two Y rails 6 made of round steel rod a rack let into the underside of each rail. These rails in turn support an X rail 7 mounted transversely to the Y rails, and formed from an aluminium extrusion. A carriage 8 containing a scanner head 9 and infra-red transmission electronics 10 is mounted to run along the X-rail. The X-rail runs on the Y rails on ballrace bearings 11 and is retained in one lateral direction by two races 12 running on either side of one of the Y rails. The X rail can be driven back and forth in the other lateral direction by a stepper motor 13 mounted centrally below the X rail. The stepper motor being connected to two pinions 14 which engage the racks on the Y rails. Mounted at one end of one of the Y rails is an opto-interrupter 15 which detects when the X rail is driven in the Y direction as far as a given limit position. All positions in the Y direction are referenced from this home position in terms of the number of steps taken by the stepper motor.

The scanner head carriage 8 runs on bearings 16 which run in grooves on the inside faces of the X rail. The carriage is attached to a toothed belt 17 which runs over pulleys at each end of the X rail and around a pulley driven by a motor 18. This motor drives the carriage back and forth along the X rail. At one end of the X rail is an opto-interrupter 19 which detects the X home position. Attached to the X rail is an optical reference strip 20 which is read by an opto-interrupter 21 mounted on the carriage. Strip 20 provides a positional scale or reference in the X direction.

The scanner head 9 (shown in FIG. 3) comprises a printed circuit board 22 on which is mounted an array of fifteen phototransistors 23 covered by a block 23a containing fifteen passages forming light guides. In either side of the block is a row of filament bulbs 24 and reflectors 25 which serve to illuminate the undersides of pattern pieces 2 placed on the scanner screen 3. The phototransistor detectors are arranged evenly spaced in a line at right angles to the X direction to detect light reflected from the pattern pieces. Also on the board 22 is circuitry (described later) for encoding and transmitting what is detected by the detectors, and a high power infra-red light emitting diode array 26, for transmitting detected data to receiving means 27 (FIG. 2).

Figure 2:
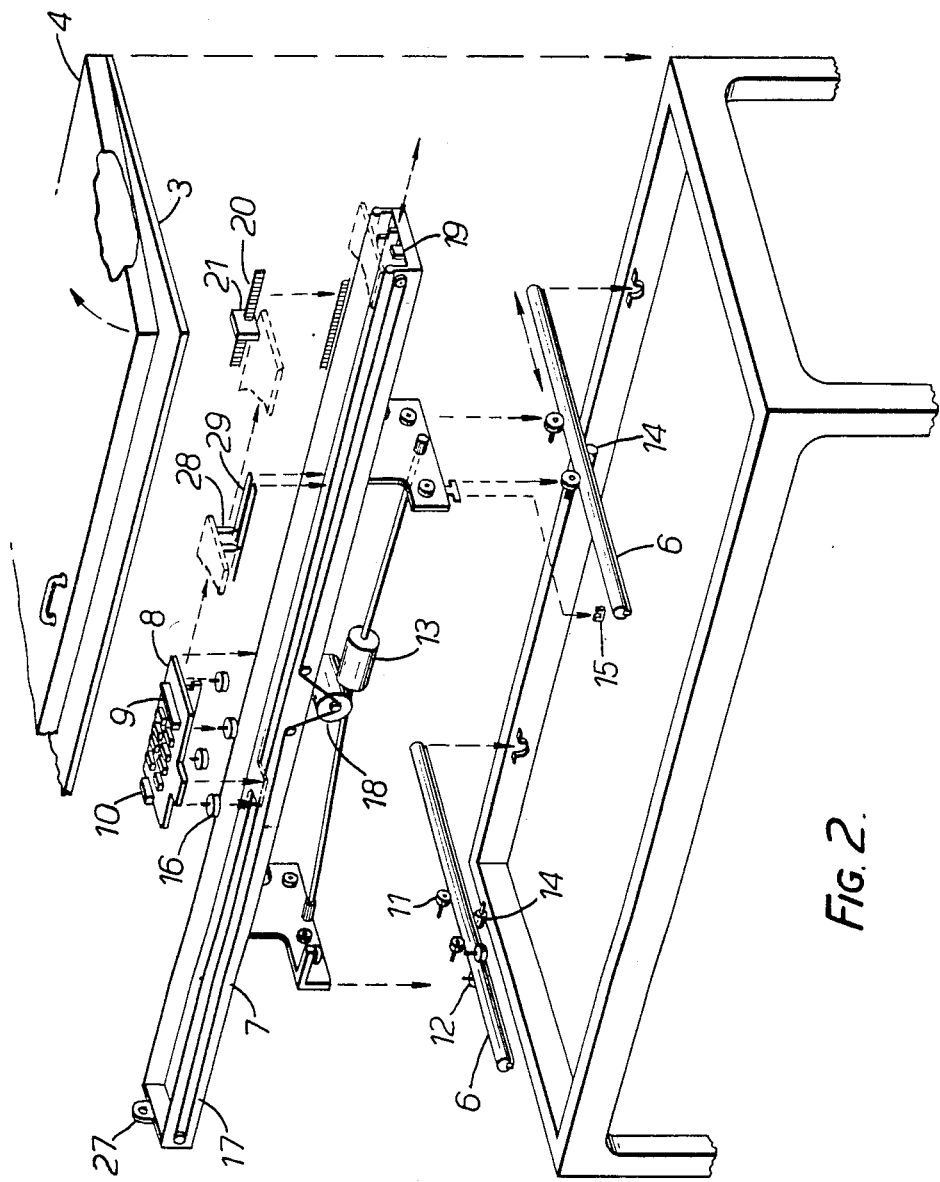
FIG. 2 is an exploded view of the scanner of FIG. 1.

Also as shown in FIG. 2, power to the circuits on the scanner head is supplied through two carbon brushes 28 which run on two brass tracks 29 attached to the X rail and running along the length of it.

The lid 4 of the scanner is lined with black sponge so that when the lid is closed, pattern pieces are held firmly down by non-reflective material which covers the whole area of the screen.

Figure 5:
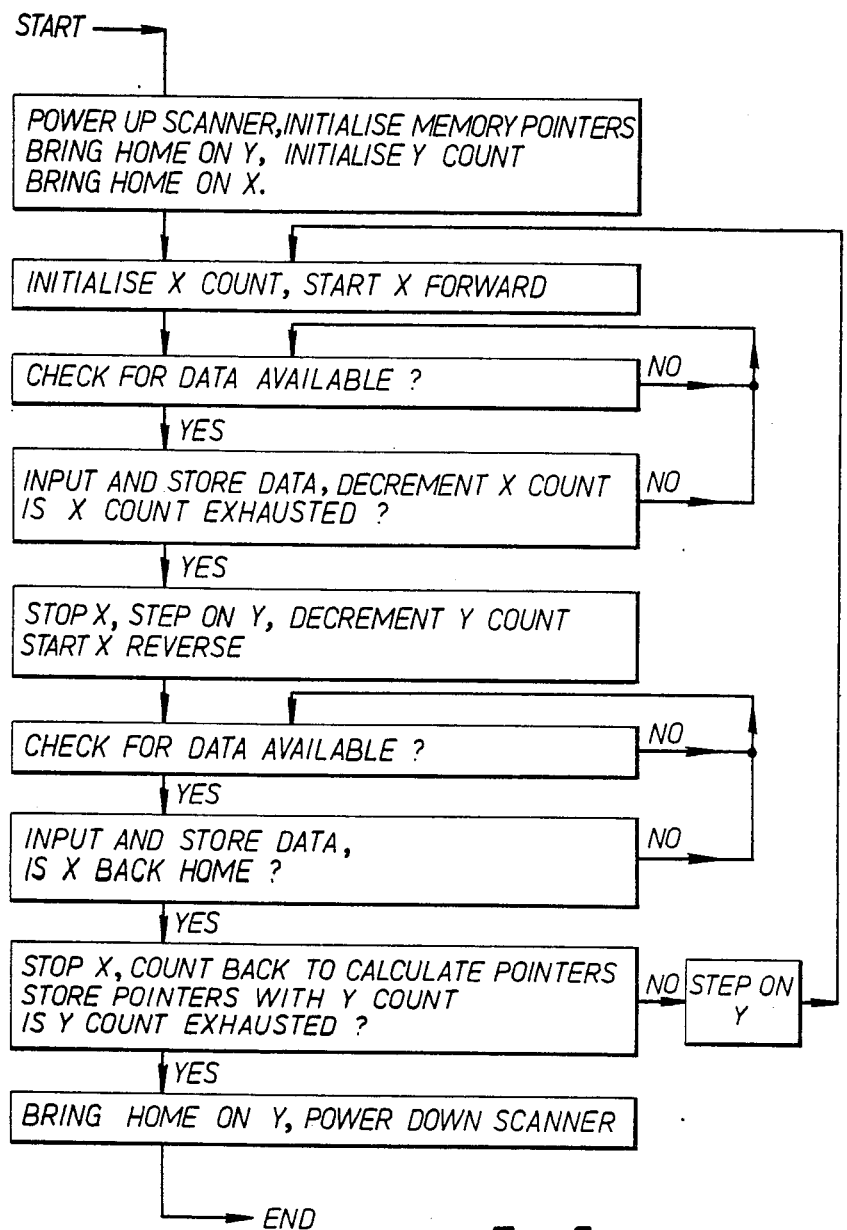
FIG. 5 is a flow diagram of scanner control and input.

In operation the scanner is powered up and the scanner carriage is returned to its home position in both the X and Y directions, following which scanning can begin. The scanner head traverses along the X-rail in the X direction to its full extent; the stepper motor 13 then advances the carriage in the Y direction and the scanner traverses back in the X direction. The carriage is advanced again in the Y direction and the process is repeated until the entire screen has been scanned. A flow chart of the software controlling this operation is shown in FIG. 5.

Figure 6:
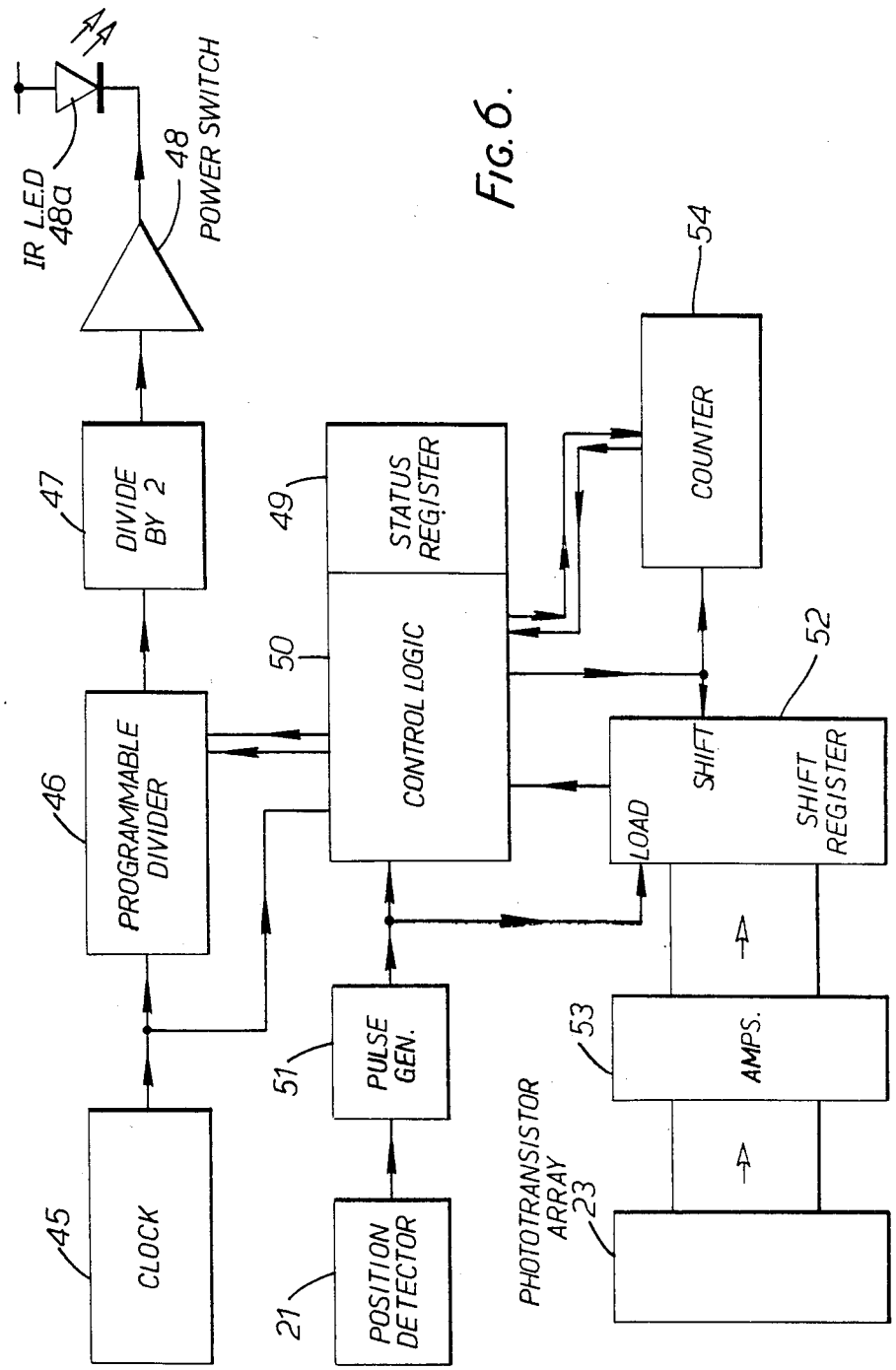
FIG. 6 is a diagram of infra-red transmitter circuitry.

Circuitry included on the scanner carriage 8 is shown schematically in FIG. 6.

Clock circuitry 45 provides pulses to synchronize other parts of the circuit. A programmable divider 46 passes a train of pulses to an output stage 47 which divides by two to maintain a duty cycle of 50%. The output stage is connected to a power switch 48 which operates a transmitting infra-red light-emitting diode, 48A.

In the idle state, when there is no data to be transmitted, a bit is set in the status register 49 to indicate that the transmitter is idle and the programmable divider 46 is set by control logic 50 to divide by three. The resulting transmitter pulses (idle pulses) are used to maintain synchronization in a receiver shown in FIG. 7.

When the opto-interrupter 21, comprising a position detector, detects a transition from light to dark on the reference strip 20, a short pulse is generated by a pulse generator 51 which loads shift register 52 with the outputs from amplifiers 53 connected to the phototransistor array 23, and sets a bit in the status register 49 to indicate that data is now available for transmission. When the next cycle of idle pulses is complete, the control logic 59 resets a counter 54, and resets the idle bit in the status register to indicate that transmission can now progress. This enables the serial output from the shift register to direct the programmable divider to divide either by two or by four for low or high data states respectively. Each bit is clocked through the shift register for encoding and transmision, and the counter is incremented accordingly to count the bits. When all the bits have been clocked through, the status bits in the status register are returned to the idle state and the process can begin again.

Figure 7:
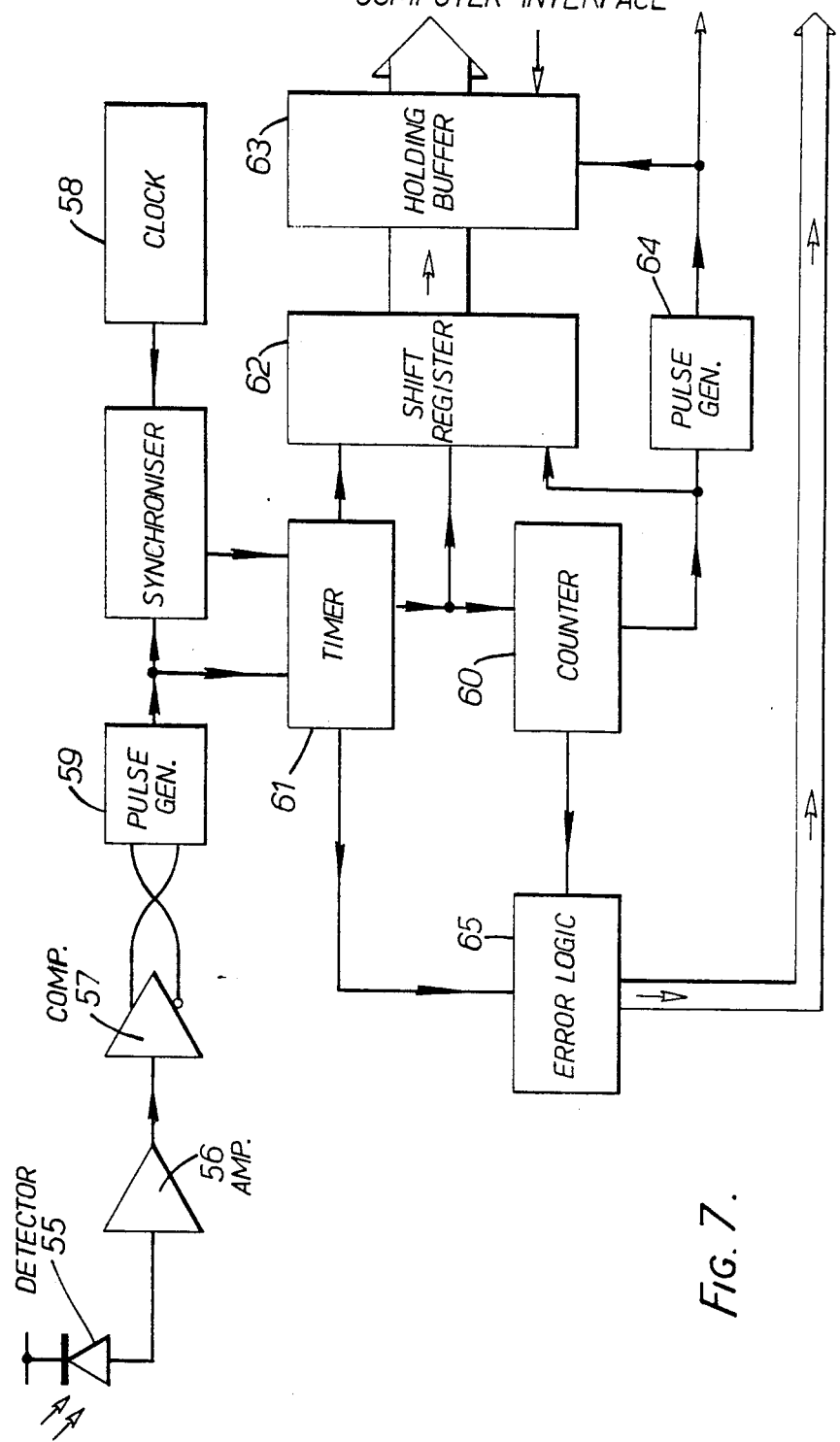
FIG. 7 is a diagram of infra-red receiver circuitry.

FIG. 7 is a schematic diagram of receiving and decoding circuitry for receiving data from the scanner carriage. The detector unit consists of a detector diode 55, an amplifier 56 and a comparator 57 with hysteresis, which converts a received light signal into a square edged electrical logic signal which is carried to the decoding circuitry on a balanced line.

A decoding circuit clock 58 runs at the same speed as the transmitter clock of FIG. 6. Output from the comparator 57 is used to trigger a pulse generator 59 the output from which is used to synchronize the clock with the incoming signal. Clock pulses are used to time the intervals between incoming pulses for decoding. These intervals are in the ratios 2;3;4 for high data; idle; low data respectively.

When idle pulses are detected a counter 60 is reset. When data is received a timer 61 decodes the input and clocks the decoded data into a shift register 62 and the counter is clocked for each bit. When a complete word has been decoded, an output from the counter transfers the data from the shift register into a holding buffer 63 and triggers a second pulse generator 64 which signals to the computer 5 that data is available. The computer 5 then reads the data from the holding buffer.

Also included is error detection circuitry 65 which detects a break in transmission (no pulses coming in), noise (if incoming pulses occur too frequently), under run (if a word is not completed before idle pulses are received) and overrun (if no idle period is detected between words). All these states could be monitored by the computer if required.

Figure 8:
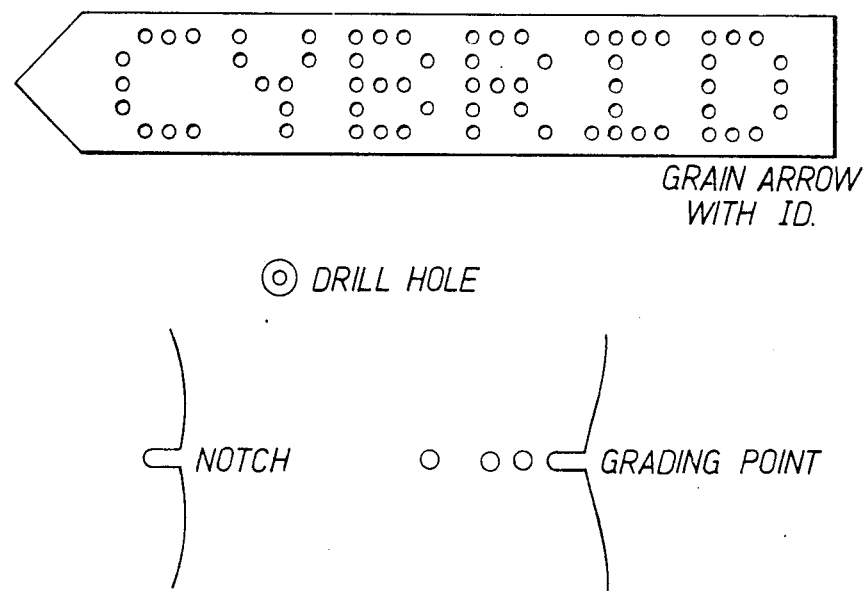
FIG. 8 shows identification marks and ID tape.

FIG. 8 shows identification marks that can conveniently be used to identify parameters of pattern pieces when scanned by the scanner.

The grain line, that is the direction of the warp of the cloth on a pattern, can be indicated on a pattern piece by a nonreflective (black) arrow which the scanner sees as a hole. This could be printed directly on the pattern piece or made from adhesive backed tape and stuck onto the pattern piece.

An alphanumeric code number, forming an Identification (ID), can be used to identify the pattern size, indicate which piece within a garment it is, show whether it is one of a handed pair (i.e. left or right) and how many of that piece occur within a garment; it may include other information as well. The code number is made up of a pattern of reflective dots within the grain arrow and is formed either by perforating the grain arrow before it is stuck to the pattern piece or by leaving clear dots if the grain arrow is printed on the piece.

Drill holes, which are small holes which are drilled in the cloth when it is cut to act as reference points when the garment is sewn together (e.g. to mark the position of a pocket on a shirt front), are indicated on a pattern piece by a non-reflective annulus, either printed directly or with a transfer such as those used for terminating pads on electronic printed circuit artwork. Each of these is seen by the scanner as a small hole with a small piece inside the hole.

Notches, which are small cuts made into the edge of a piece of cloth after it has been cut out to act as reference points when the garment is sewn up (e.g. to indicate the starting position of a seam), are indicated on a pattern piece by indentations cut into the edge of the pattern. Hand punches for making these indentations are widely available.

Grading points are reference points on the edges of a piece which are not indicated on the cloth but are used for defining a piece in one size in terms of a piece of another size. The alterations in the positions of these points to specify all different sizes are known as grading rules. Grading points are marked on a pattern piece in the same way as notches but have perforations next to the notch to identify the point. These perforations comprise a binary code.

Figure 9:
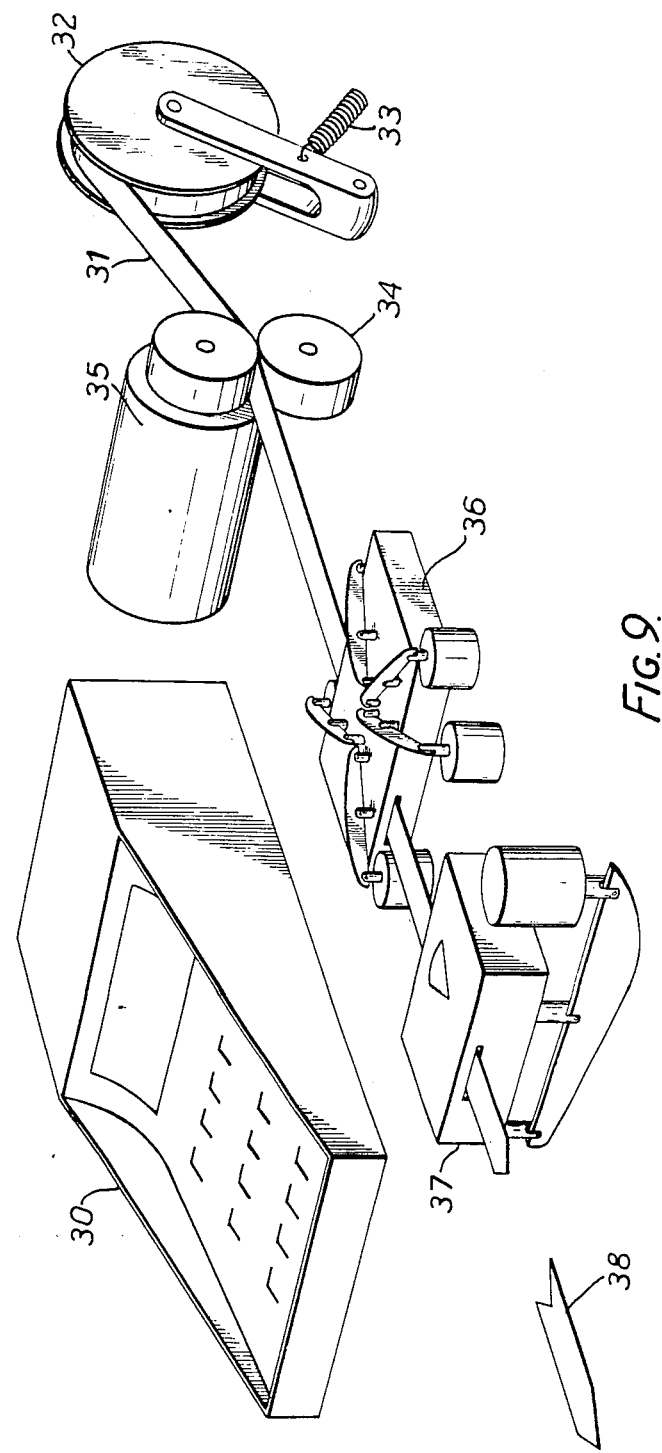
FIG. 9 is a perspective view of label-making equipment.

As shown in FIG. 9, a device for preparing grain arrow labels comprises a keyboard 30 into which ID details and other instructions to the device are input. The keyboard is coupled to a microprocessor and memory circuit (not shown) which record details and control the mechanical parts of the device. Raw backed adhesive tape 31 is stored on a spool 32 which is spring loaded at 33 to take up any slack; from here the tape is fed between a sprung roller 34 and a roller attached to the shaft of a stepper motor 35, which drives the tape through the machine. From the rollers the tape passes through an array 36 of solenoid operated punches where it is perforated as required, and then to a solenoid operated cutting punch 37 which cuts off the required length with an arrow head shaped cut.

In operation, ID details are typed into the key board and the key for the required length is pressed. The motor is stepped on until the first field of holes to be punched is under the punches; the appropriate holes are punched and the motor is stepped on to the next field and so on. When the full ID has been punched, the motor is stepped on until the required total length has been fed through. The cutter is then operated and the completed label 38 can be withdrawn by hand. A backing tape is peeled off the back of the label and it is stuck onto the pattern piece in the direction of the grain.

Figure 12:
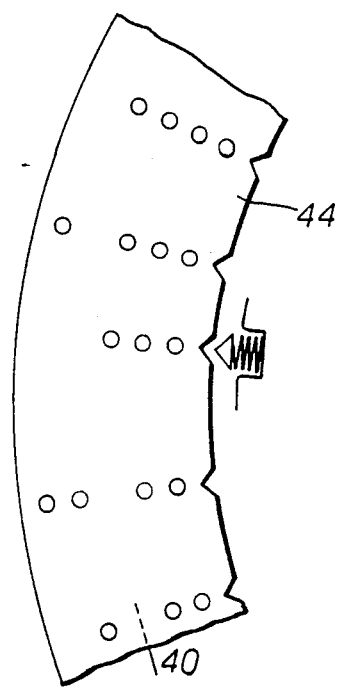
FIGS. 10-12 are views of a grading point marking machine.
Figure 10:
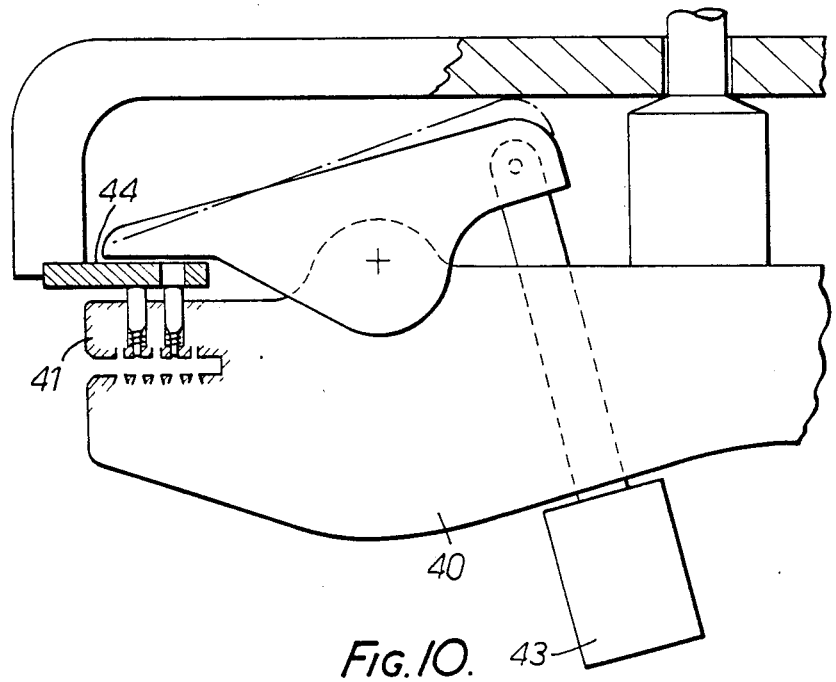
Figure 11:
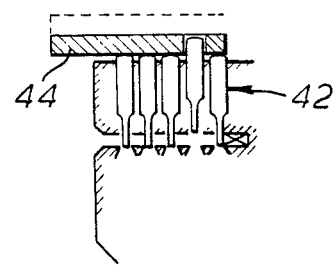

FIGS. 10 to 12 show views of a device for making grading points. Devices for making notches are widely available. For marking these notches as grading points a grading punch is used after the notches have been made. This punch consists of an anvil 40 with an internal guide block 41 in which spring loaded cylindrical pins 42 can slide. These pins can be pushed down through the guide and into the anvil by means of a rocker operated by a solenoid 43. Between the pins and the rocker is a selector plate 44 which is drilled to allow those pins not selected to pass through it. Each pattern of holes in the selector plate has a corresponding notch on the inner circumference of the plate to locate the holes accurately over the pins. The selector plate can be rotated and is marked with letters to correspond to each code of holes. In use the selector plate is rotated until the required code is selected, the pattern piece is inserted in the slot of the anvil until the notch cut in the pattern piece engages on a peg in the anvil, the solenoid is operated and the coded pattern piece withdrawn.

When a table of pattern pieces has been scanned the computer memory will contain an array of bits representing each unit area of the scanner table. Where a bit is set (1) light was reflected and where a bit is reset (0) it was not.

Figure 13:
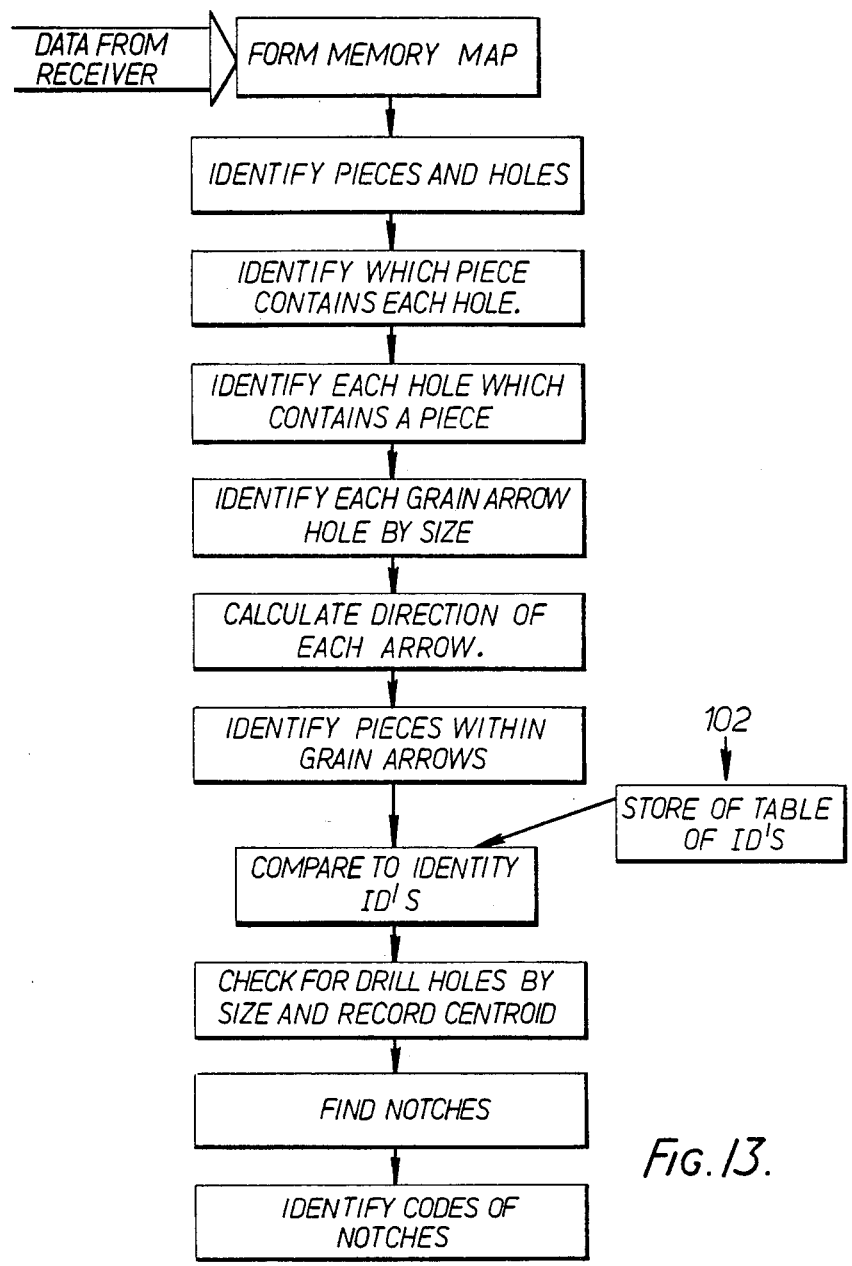
FIG. 13 is a flow chart of memory map analysis.

The following procedure shows how the data is interpreted (this is shown in the flow chart of FIG. 13):

Identify all pieces and holes, listing holes separately from pieces.

Go through the list of holes to find by which piece each hole is enclosed, marking holes and pieces accordingly.

Go through the list of pieces to find those that are enclosed by holes and mark accordingly.

Identify grain arrow holes for each piece by size. Find the centroid of each of these and the furthest point from it to identify its direction relative to the scanned axis.

Check for pieces within fields referenced to the centroid and axis of each grain line arrow to build up the ID pattern. Look up in the table of ID patterns and record for each piece.

Check for any drill holes, i.e. holes less than a given maximum area and containing a piece. Record centroid of enclosed piece.

Go round all identified pieces finding and marking notches.

Check for holes within fields referenced to notches to find and identify grading points.

To identify pieces and holes, the memory image is scanned starting at one corner of the memory image of the scanned table, where the first unitary area encountered is '0' (outside a piece). Steps are taken along the X axis until the end of that row or until a change to '1' is encountered. This point must be on the edge of a piece. The first point encountered becomes the reference point for a piece and any entry into a list of pieces must include the X and Y co-ordinates of this point. An entry into the list of pieces for this piece can now be made. Continuing to step along the X row, all points are ignored until a change back to '0' is encountered. In general this may either be the edge of the piece or the edge of a hole within the piece. To discover which, it is necessary to follow along the edges of all known pieces and holes to see if the point is on an already recorded edge. This is done by following this edge, checking that no point on this edge is the reference point for any piece or hole yet recorded. The check is complete when the edge has been followed right back to the original point. It is important to note that on returning to the original point a check must be made in all four directions from that point in case the piece is only one unit wide at that point.

Stepping along an edge is done by testing the adjacent points in the memory image in all four directions starting with the direction pointing to the previous point tested and checking in a clockwise direction. For the first point, the starting direction is considered to be the X direction.

If a point is not on a known edge a new edge has been encountered and a record for this edge must be put into the list of holes or pieces, depending upon whether the reference point is 0 or 1. From the end of each X row the check is continued at the beginning of the next row until the entire memory image of the table has been covered. All pieces and all holes are now identified by their reference point co-ordinates.

To find if a piece encloses a particular hole, the memory image of the edge of the piece is checked by stepping along the edge and the number of times the edge of the piece crosses the X axis which passes through the reference point of the hole at X values less than the X value of the hole reference point is recorded. If when a full circumference has been completed this number is odd the hole is enclosed; if the number is even it is not. The same technique is applied to pieces within holes, except that the roles are exchanged.

Calculating the area of a piece or a hole can be done by counting the number of points within the piece or hole and adding the number of points on the edge. A much faster method is to step around the edge integrating the area between the edge and the $Y=0$ axis using the formula $A = \int Y dx$. To obtain an accurate result the integration must consider the boundary to be halfway between the points on the edge and those just off the piece. This is achieved by increasing the area by one half unit for each step taken and adding one at the end for the extra square formed by four outside corners. Any extra outside corners will be cancelled by inside corners.

To find the centroid of a piece or hole, for example of a grain arrow, the formulae used are:

$$\overline{X} = \frac{\int -x^2 dy}{A} \text{ and } \overline{Y} = \frac{\int Y^2 dx}{A}.$$

In this case the edge is included by adding half the relevant co-ordinate to the integrand at each step and dividing by A-1. This calculation is not strictly accurate but gives a very good result. If necessary a more accurate integration can be done taking into consideration the change, if any, of direction at every point.

To find the distance between any two points $(X_1, Y_1)$ and $(X_2, Y_2)$, the formula $d^2 = (X_1-X_2)^2 + (Y_1-Y_2)^2$ is used. To find the furthest point on an edge from a given point it is simply a matter of stepping around the edge checking the distance at each point and keeping a record of the greatest distance encountered so far and the corresponding point. To speed up this operation it is useful to use the fact that $(X\pm 1)^2 = X^2 \pm 2X + 1$. With this the value of $d^2$ can be calculated from the value at the previous point by merely adding or subtracting $1x_1 - x_1$ twice if there is an increase or decrease respectively in X and adding 1, (and similarly for a change in Y) at each step.

To find the angle $\theta$ between a line $P_2 P_1$ joining two points $(X_1, Y_1)$ and $(X_2, Y_2)$ and the X axis the formulae $$\text{Sin } \theta = \frac{(Y_2 - Y_1)}{d}, \text{ Cos } \theta = \frac{(X_2 - X_1)}{d}$$

are used, where d is the distance between the points.

By means of these operations it is possible to identify the location of the grain arrow and its direction relative to the X axis.

When decoding IDs a field is defined by a circle of radius r about a point (X,Y). To check a field that is at a distance p along the grain arrow from the centroid of the arrow and a distance q from that axis, (positive directions taken as in the direction to the point of the arrow and 90° anticlockwise from this direction), the co-ordinates of the center of the field are $X = X_c + p \text{ Cos } \theta - q \text{ Sin } \theta$  $Y = Y_c + p \text{ Sin } \theta + q \text{ Cos } \theta$. To find if a piece lies within the circle of radius r about this point it is necessary to check only that the reference point for a piece lies within the field if they are so defined that they will fully contain the piece.

When checking that a point lies within a certain distance of another point it is faster to first consider whether the point is within the square which is parallel to the X and Y axes and just encloses the circle about the reference point (Xr, Yr), using the following conditions: $X_r - r \leq X \leq X_r + r$, $Y_r - r \leq Y \leq Y_r + r$. This test eliminates a large number of possible points if the square is small; the exhaustive test $(X - X_r)^2 + (Y - Y_r)^2 \leq r^2$ can then be done.

The technique for finding a notch in the edge of the pattern piece relies on the fact that the mouth or opening of the notch in the edge of the piece is narrower than the depth of the notch into the piece. Hence, the straight-line distance between the two points that define the notch opening is smaller than the perimeter distance between the two points when measured over a small distance. (See FIG. 8.) is set up covering 10 consecutive steps around the perimeter, the table listing the co-ordinates of the points corresponding to those steps and the distance between each point and the first point in the table. The table is checked to see if any point after the 5th in the table is less than 2 units distant from the first point in the table. When such a point is found the details are recorded, as it is in the vicinity of a notch. All points in the table which meet the conditions are recorded. The entire table is then stepped around the piece, the second point becoming the first, the third becoming the second and so on, and again any points within the vicinity of a notch are recorded. When the entire piece has been stepped round, the resultant list of points close to notches is divided up into groups which are continuous; that is, all points that are close to the same notch are grouped together. In each group a search is then made for a pair of points which are the greatest number of steps apart for the smallest separation. The center of the notch is taken to be midway between these two points.

Reference fields for holes identifying notches as grading points are defined by concentric circles centred about the centre of the notch and lying within the piece, the inner circle forming the first field, the first and second circles the next and so on.

In this manner it is possible electronically to identify scanned pattern pieces, and also holes, grain arrows, ID's, notches and grading points within the pattern pieces.

In summary, it will be seen that the preferred embodiment provides a scanner that can scan a large area, e.g. more than one square meter, at a high speed, e.g. the scanning head can move at over 20 cm per second, and is not interrupted when a boundary is found. It can scan several pieces and can identify and locate inner boundaries defining items of information including grain direction, piece identification and drill holes.

We claim:

1. A pattern scanner, for scanning pattern pieces, comprising:
   a plurality of radiation sensitive elements;
   means for guiding said elements in X and Y coordinate directions with said elements evenly spaced in the Y coordinate direction;
   control means for controlling the guiding means to cause said elements to make uninterrupted scans across a pattern piece in the X coordinate direction, such scans alternating with stepping in the Y coordinate direction by steps substantially equal to n times half of the spacing of said elements in the Y coordinate direction (where n is an odd integer), in order to scan a matrix of unitary areas encompassing the entire area of said pattern piece within its outer boundary;
   and means for the transmission of data sensed by said elements during said scans in both X directions.

2. A scanner as claimed in claim 1, in which each traverse of the elements in the X co-ordinate direction comprises a traverse across the full width of the area to be scanned.

3. A scanner according to claim 1 and comprising means for illuminating that side of a pattern piece facing the elements with radiation to which the elements are sensitive, whereby the elements operate to sense reflected radiation.

4. A scanner as claimed in claim 1, wherein the transmission means comprises a register for holding the data sensed by said elements at each of a plurality of positions of said elements and means for moving the data serially from said register.

5. A scanner as claimed in claim 4, wherein the transmission means comprises means for transmitting a radiation beam from a support for said elements and means (27) for receiving that radiation beam.

6. A scanner as claimed in claim 5, wherein the beam transmitting means comprises means for modulating said beam with pulses.

7. A scanner as claimed in claim 1, wherein the transmission means comprises means for transmitting a radiation beam from a support for said elements and means (27) for receiving that radiation beam.

8. A scanner as claimed in claim 7, wherein the beam transmitting means comprises means for modulating said beam with pulses.

9. A scanner as claimed in claim 8, wherein said pulses comprise synchronising pulses, for synchronising the functioning of said transmitting and receiving means, said synchronising pulses being interspersed with data defined by further pulses.

10. A scanner as claimed in claim 8, wherein the transmitting means comprises an infra-red transmitter for producing said beam.

11. A scanner according to claim 1, wherein said data comprises digital data composed of bits having a first state, when a unitary area of a first type is detected corresponding to material contained an area of a pattern piece, and a second state when a unitary area of a second type is detected corresponding to an absence of material of a pattern piece, unitary areas of the second type comprising an area outside the material of any pattern piece, an area within a hole within a pattern piece or an area of a pattern piece having a property, as sensed by said elements, equivalent to the absence of pattern piece material.

12. A scanner according to claim 11, and comprising means for processing said data to identify information conveyed by a pattern piece within its outer boundary and defined at least in part by areas of the second type.

13. A scanner as claimed in claim 12, wherein the processing means comprises means for identifying information recorded on at least one pattern piece as a direction indicated by a directional indicator defined by the shape of an area of the second type.

14. A scanner as claimed in claim 12 and including means for identifying area of the first type surrounded by areas of the second type on the basis of size.

15. A scanner for scanning pattern pieces and comprising:
   a support for supporting at least one pattern piece to be scanned;
   scanning means comprising a plurality of radiation sensitive elements for scanning across said at least one pattern piece without interruption in an X-coordinate direction, such scans alternating with stepping in the Y coordinate direction to sense, during such scans in the X coordinate direction, radiation coming in a direction from the support so that said elements provide data which identify and locate areas of a first type, corresponding to material of a pattern piece, and areas of second type, a corresponding to (a) areas outside a pattern piece, (b) holes within a pattern piece, and (c) an area of a pattern piece having a property, as sensed by said elements, corresponding to a hole in said pattern piece;

means for storing characteristics corresponding to different types of areas of the second type; and means for processing said data in comparison with said stored information to identify, locate and distinguish between the external boundary of at least one pattern piece and information conveyed by said at least one pattern piece and defined at least in part by areas of said second type detected within said external boundary.

16. A scanner as claimed in claim 15, including memory means for recording the data sensed by said elements, thereby to produce a memory map corresponding to an area scanned by the scanner, and means for identifying in the memory map areas corresponding to pattern pieces by finding internal and external boundaries thereof.

17. A scanner as claimed in claim 15, wherein the processing means comprises means for identifying grain direction information recorded on at least one pattern piece as a direction indicated by a directional indicator defined by the shape of an area of the second type.

18. A scanner as claimed in claim 15, wherein the processing means includes means for distinguishing between, and thus identifying, a plurality of different pattern piece identifying codes formed as different pre-selected configurations of areas, thereby distinguishing between a plurality of pattern pieces conveying said codes.

19. A scanner according to claim 18, and comprising means for storing a plurality of said pre-selected configurations and means for comparing a sensed configuration with the stored configurations to identify the sensed configuration.

20. A scanner as claimed in claim 18, wherein the identifying means comprises means for processing information recorded on at least one pattern piece as a direction indicated by a directional indicator defined by the shape of an area of the second type and means for sensing said pattern piece identifying code within an area of said directional indicator.

21. A scanner as claimed in claim 20 and including means for identifying areas of the first type surrounded by areas of the second type on the basis of size.

22. A scanner as claimed in claim 15 and including means for identifying areas of the second type surrounded by areas of the first type on the basis of size.

23. A scanner as claimed in claim 15 and including means for identifying notches in a pattern piece boundary on the basis of a conparison between two points and the separation of those two points.

24. A scanner as claimed in claim 23 and further including means for identifying coded information in the form of holes adjacent to a notch in a pattern piece.

25. A pattern scanner comprising:

means for supporting a pattern piece to be scanned;

a carriage movable in X and Y orthogonal directions relative to said supporting means;

a plurality of radiation sensitive elements carried by said carriage for detecting radiation coming in a direction from said supporting means;

means for guiding said carriage for movement in said X and Y orthogonal directions;

control means for controlling the guiding means in order to cause said elements to scan a matrix of unitary areas of a pattern piece supported by the supporting means by scanning in the X direction, such scanning alternating with steps in the Y direction;

means conveyed by the carriage for converting data from said elements into a serial stream of data;

transmission means conveyed by the carriage for converting said serial stream into a modulated beam of radiation transmitted in a direction away from the carriage;

and means for receiving said beam mounted to move with said carriage in said Y direction and being fixed relative to said supporting means in said X direction.

* * * * *

UNITED STATES PATENT AND TRADEMARK OFFICE
CERTIFICATE OF CORRECTION

PATENT NO. : 4,575,628
DATED : March 11, 1986
INVENTOR(S) : Bankart et al.

It is certified that error appears in the above-identified patent and that said Letters Patent is hereby corrected as shown below:

```
Title should be --X-Y Scanner for Scanning Pattern Pieces--;

Column 4, line 2, "In" should be --On--;

Column 9, line 2, insert --To find a notch a table --before
"is"--;

Column 9, line 23, "centred" should be --centered--;

Column 9, line 24, "centre" should be --center--;

Column 10, line 19, "synchronising" should be --synchronizing--;

Column 10, line 21, "synchronising" should be --synchronizing--;

Column 10, line 63, delete "a" (second occurrence)--;
```

Signed and Sealed this

Eighteenth Day of November, 1986

*Attest:*

DONALD J. QUIGG

*Attesting Officer*    *Commissioner of Patents and Trademarks*